US007493498B1

(12) United States Patent
Schmidt et al.

(10) Patent No.: US 7,493,498 B1
(45) Date of Patent: Feb. 17, 2009

(54) INPUT/OUTPUT PERMISSION BITMAPS FOR COMPARTMENTALIZED SECURITY

(75) Inventors: Rodney W. Schmidt, Dripping Springs, TX (US); Brian C. Barnes, Round Rock, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 860 days.

(21) Appl. No.: 10/107,784

(22) Filed: Mar. 27, 2002

(51) Int. Cl.
*G06F 12/14* (2006.01)
(52) U.S. Cl. ..................................................... 713/193
(58) Field of Classification Search ....................... None
See application file for complete search history.

(56) References Cited

U.S. PATENT DOCUMENTS 5,146,565 A * 9/1992 Blanck et al. ................. 710/36
5,596,739 A * 1/1997 Kane et al. ................... 711/152
5,832,299 A * 11/1998 Wooten ......................... 710/9
6,978,018 B2 * 12/2005 Zimmer ........................ 380/30

OTHER PUBLICATIONS

Intel, "Intel Architecture Software Developer's Manual, vol. 1: Basic Architecture", 1997, pertinent chapters: 2 and 9, obtained from http://rm-f.net/~orange/devel/specifications/.*

Intel, "Intel Architecture Software Developer's Manual, vol. 3: System Programming", 1999, pertinent chapters 2 and 9, obtained from http://rm-f.net/~orange/devel/specifications/.*
PCT/US02/40396 International Search Report dated Dec. 17, 2002.
Intel Corporation "Intel 386 DX Microprocessor 32-Bit CHMOS Microprocessor with Integrated Memory Management" *Intel User's Manual*, Dec. 1995 XP002243542 pp. 34-61.
Intel Corporation "System Programming Guide" *Intel Architecture Software Developer's Manual*, vol. 3, 1997 XP-002248376.
Intel Corporation "Basic Architecture" *Intel Architecture Software Developer's Manual*, vol. 1, 1997 XO-002243543.

* cited by examiner

*Primary Examiner*—Emmanuel L Moise
*Assistant Examiner*—Jeffrey D Popham
(74) *Attorney, Agent, or Firm*—Williams, Morgan & Amerson

(57) ABSTRACT

A method and apparatus for selectively executing an I/O instruction. The method includes creating an I/O permission bitmap in a memory and receiving an I/O port number and a security context identification (SCID) value. The method also includes using the SCID value and the I/O port number to access the I/O permission bitmap stored to obtain a permission bit corresponding to the I/O port and executing the I/O instruction dependent upon a value of the permission bit corresponding to the I/O port. The I/O permission bitmap includes a plurality of permission bits. Each of the permission bits corresponds to a different one of a plurality of I/O ports. Each of the permission bits has a value indicating whether access to the corresponding I/O port is allowed. The I/O port number indicates the I/O port referenced by the I/O instruction. The SCID value indicates a security context level of a memory location including the I/O instruction.

36 Claims, 9 Drawing Sheets

INPUT/OUTPUT PERMISSION BITMAPS FOR COMPARTMENTALIZED SECURITY

BACKGROUND OF THE INVENTION

1. Field of the Invention

This invention relates generally to memory management systems and methods, and, more particularly, to memory management systems and methods that provide protection for data stored within a memory.

2. Description of the Related Art

The 80x86 (i.e., "x86") processor architecture allows for an input/output (I/O) address space separate from a memory address space. The x86 I/O address space is a continuous block of 64 k 8-bit data units located at addresses ranging from 0 to 65,535 (0000h to FFFFh, where 'h' indicates a hexadecimal number), and is typically used for communication with peripheral devices (e.g., a keyboard, disk drives, etc.). Peripheral devices typically include special access registers called "I/O ports," or simply "ports." The I/O ports may be 8-bit ports, 16-bit ports, or 32-bit ports. The 8-bit ports are accessed using their unique byte addresses. The 16-bit I/O ports include two adjacent bytes, and 32-bit I/O ports include four adjacent bytes. The 16- and 32-bit I/O ports are accessed using the lowest address of all of their adjacent bytes.

Addresses in the I/O address space of an x86 processor may correspond to different ports of peripheral devices coupled to the x86 processor. The x86 processor drives an M/IO (memory-I/O) signal line with an M/IO signal that indicates whether an address, conveyed via address signals driven on address signal lines, is in the memory address space or the I/O address space.

The x86 instruction set includes special I/O instructions to access the I/O address space. The x86 I/O instructions provide methods for exchanging data between internal registers of an x86 processor and I/O ports mapped to the I/O address space, and between a memory coupled to the x86 processor and the I/O ports. The x86 I/O instructions include the "IN" (input from port) and "OUT" (output to port) register I/O instructions, and the "INS" (input string from port) and "OUTS" (output string to port) block or string I/O instructions. The block x86 instructions transfer data directly from an I/O port to the memory, and from the memory to the I/O port.

A "task" is a single, sequential thread of execution. The 80286 and later x86 processors support multitasking, the ability to run multiple tasks concurrently. Only one task is actually executing at any given time; the x86 processor simply switches between multiple tasks as directed.

Modern x86 processors are able to operate in any one of several different modes, including the real address or "real" mode, the protected virtual address or "protected" mode, and the virtual 8086 or "virtual" mode. In the protected mode, use of the I/O instructions is controlled by the setting of the IOPL (I/O privilege level) field in the FLAGS register. In 80386 and later x86 processors, access to individual ports mapped to the I/O address space is controlled by an I/O permission bit map within the task's task state segment (TSS). Most protected mode operating systems restrict access to I/O ports to themselves (privilege level 0), and to a small number of "trusted" device drivers (privilege level 1).

When an 80386 or later x86 processor is operating in protected mode, two mechanisms may be employed to limit access by tasks to the I/O address space. First, use of the I/O instructions is controlled by the setting of the I/O privilege level (IOPL) field in the flags (EFLAGS) register. Second, access to individual I/O ports in the I/O space may be controlled via an I/O permission bitmap in a task state segment (TSS) of each of the tasks. It is noted that the I/O permission bitmap mechanism is implemented only on 80386 and later x86 processors.

Most protected mode operating systems attempt to restrict the use of I/O instructions to itself and a small number of "trusted" device drivers. In the concentric ring privilege model of the x86 processor architecture, protected mode operating system software typically executes in the inner ring at privilege level 0, and trusted device driver software typically executes in a ring surrounding the inner ring at privilege level 1 or at privilege level 0. Application programs typically execute in an outer ring at privilege level 3.

When an x86 processor operating in protected mode executes an I/O instruction of a task, the x86 processor first compares the current privilege level (CPL) of the task to the I/O privilege level (IOPL). If the current privilege level (CPL) of the task is at least as privileged as (i.e., is numerically less than or equal to) the I/O privilege level (IOPL), the x86 processor executes the I/O instruction. If, on the other hand, the current privilege level (CPL) of the task is not as privileged as (i.e., is numerically greater than) the I/O privilege level (IOPL), the x86 processor checks the I/O permission bitmap in the task state segment (TSS) of the task.

FIG. 1 will now be used to illustrate the well known I/O permission bitmap protection mechanism of the x86 architecture. FIG. 1 is a diagram illustrating a task state segment (TSS) 102, and a corresponding I/O permission bitmap 104, stored in a memory 100. The task state segment (TSS) 103 starts at a beginning (i.e., a base) of a memory segment, and the I/O permission bitmap 104 ends at an end (i.e., a limit) of the memory segment. The task state segment (TSS) 102 includes a 16-bit "I/O map base" at relative address 66h within the memory segment. The I/O map base contains an offset, in bytes, of a first byte of the corresponding I/O permission bitmap 104.

Each bit of the I/O permission bitmap 104 corresponds to a byte in the I/O space. For example, the first bit of the I/O permission bitmap 104 represents the 8-bit port at address '0' in the I/O space, the second bit represents the 8-bit port at address '1' in the I/O space, and so on. The number of the I/O port being accessed is used as a bit offset into the I/O permission bitmap 104. If the bit in the I/O permission bitmap 104 corresponding to the I/O port being accessed is cleared to '0', the x86 processor (coupled to the memory 100 and accessing the I/O protection bitmap 104) executes the I/O instruction. If the bit is set to '1', the x86 processor does not execute the I/O instruction, and generates a general protection fault. When 16-bit word, or 32-bit double word, I/O ports are being accessed, all of the bits representing adjacent bytes of the ports must be cleared to '0' for the x86 processor to execute the I/O instruction.

As I/O spaces tends to be sparsely populated, and 8 k bytes would be needed to represent all 64 k ports of the I/O spaces, the I/O permission bitmap protection mechanism includes a way to abbreviate I/O permission bitmaps. I/O ports with addresses extending beyond the end of an I/O permission bitmap are treated as if the corresponding bits in the I/O permission bitmap are set to '1'.

A problem occurs in that the I/O protection bitmap mechanism of the x86 processor architecture is not sufficient to adequately protect the I/O address space. For example, any task executing at the supervisor level (e.g., having a CPL of 0) can access any port of the I/O address space at any time. In addition, a first task executing at the supervisor level can modify the bits in an I/O permission bitmap of a second task to allow the second task access to any or all of the ports in the I/O address space. The second task may then proceed to access one or more of those ports. The present invention is directed to systems and/or methods that may solve, or at least reduce, the above described inadequate I/O space protection problem of the x86 architecture.

SUMMARY OF THE INVENTION

According to one aspect of the present invention, a method for selectively executing an input/output (I/O) instruction is provided. The method includes creating an input/output (I/O) permission bitmap in a memory and receiving an I/O port number and a security context identification (SCID) value. The method also includes using the SCID value and the I/O port number to access the I/O permission bitmap stored to obtain a permission bit corresponding to the I/O port and executing the I/O instruction dependent upon a value of the permission bit corresponding to the I/O port. The I/O permission bitmap includes a plurality of permission bits. Each of the permission bits corresponds to a different one of a plurality of I/O ports. Each of the permission bits has a value indicating whether access to the corresponding I/O port is allowed. The I/O port number indicates the I/O port referenced by the I/O instruction. The SCID value indicates a security context level of a memory location including the I/O instruction.

BRIEF DESCRIPTION OF THE DRAWINGS

The invention may be understood by reference to the following description taken in conjunction with the accompanying drawings, in which like reference numerals identify similar elements, and in which.

Figure 1:
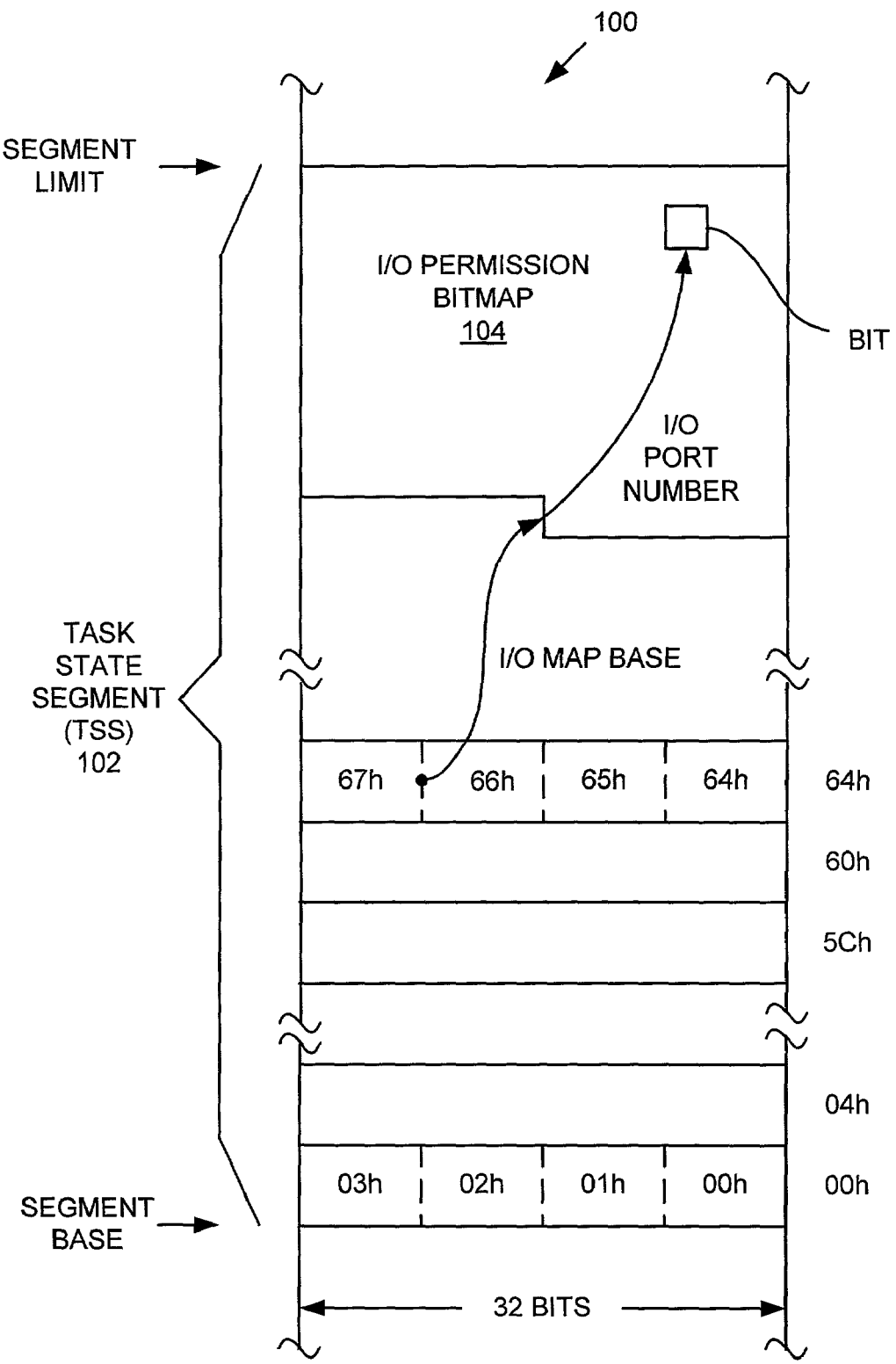
FIG. 1 is a diagram illustrating a task state segment (TSS) of the x86 architecture, and a corresponding I/O permission bitmap of the x86 architecture, stored in a memory.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
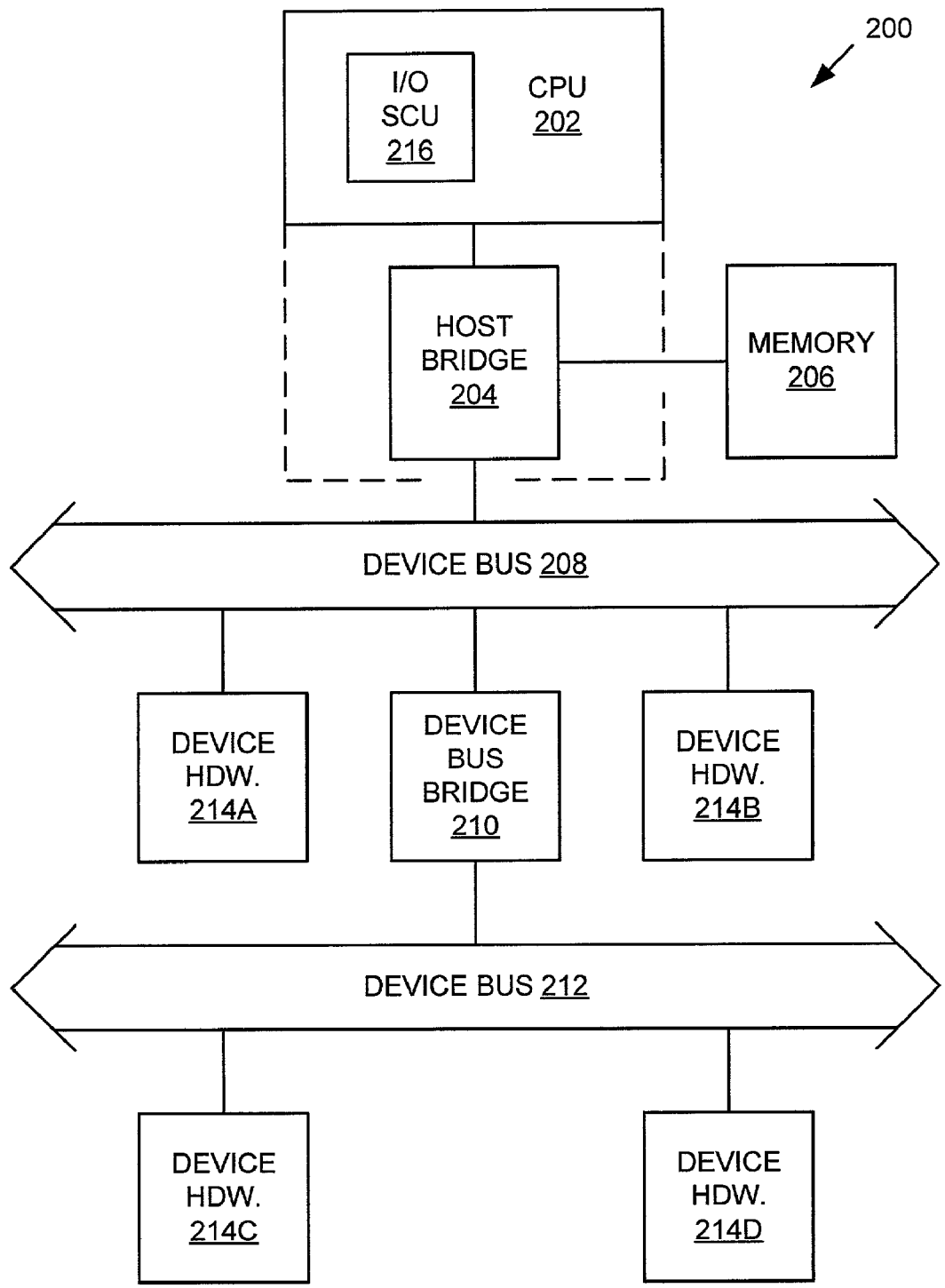
FIG. 2 is a diagram of one embodiment of a computer system including a central processing unit (CPU), a system or "host" bridge, a memory, a first device bus (e.g., a peripheral component interconnect or PCI bus), a device bus bridge, a second device bus (e.g., an industry standard architecture or ISA bus), and four device hardware units, wherein the CPU includes an input/output (I/O) security check unit (SCU) used to protect the device hardware units from unauthorized accesses generated by the CPU.

FIG. 2 is a diagram of one embodiment of a computer system 200 including a CPU (processor) 202, a system or "host" bridge 204, a memory 206, a first device bus 208 (e.g., a peripheral component interconnect (PCI) bus), a device bus bridge 210, a second device bus 212 (e.g., an industry standard architecture (ISA) bus), and four device hardware units 214A-214D. The host bridge 204 is coupled to the CPU 202, the memory 206, and the first device bus 208. The host bridge 204 translates signals between the CPU 202 and the first device bus 208, and operably couples the memory 206 to the CPU 202 and to the first device bus 208. The device bus bridge 210 is coupled between the first device bus 208 and the second device bus 212, and translates signals between the first device bus 208 and the second device bus 212. In the embodiment of FIG. 2, the device hardware units 214A and 214B are coupled to the first device bus 208, and the device hardware units 214C and 214D are coupled to the second device bus 212. One or more of the device hardware units 214A-214D may be, for example, storage devices (e.g., hard disk drives, floppy drives, and CD-ROM drives), communication devices (e.g., modems and network adapters), or input/output devices (e.g., video devices, audio devices, and printers).

In the embodiment of FIG. 2, the CPU 202 includes an input/output (I/O) security check unit (SCU) 216. The device hardware units 214A-214D may be mapped to various I/O ports of the I/O space of the CPU 202, and the CPU 202 may communicate with the device hardware units 214A-214D via corresponding I/O ports. In this situation, the I/O SCU 216 is used to protect the device hardware units 214A-214D from unauthorized accesses generated by the CPU 202. It is noted that in other embodiments, the host bridge 204 may be part of the CPU 202 as indicated in FIG. 2.

Figure 3:
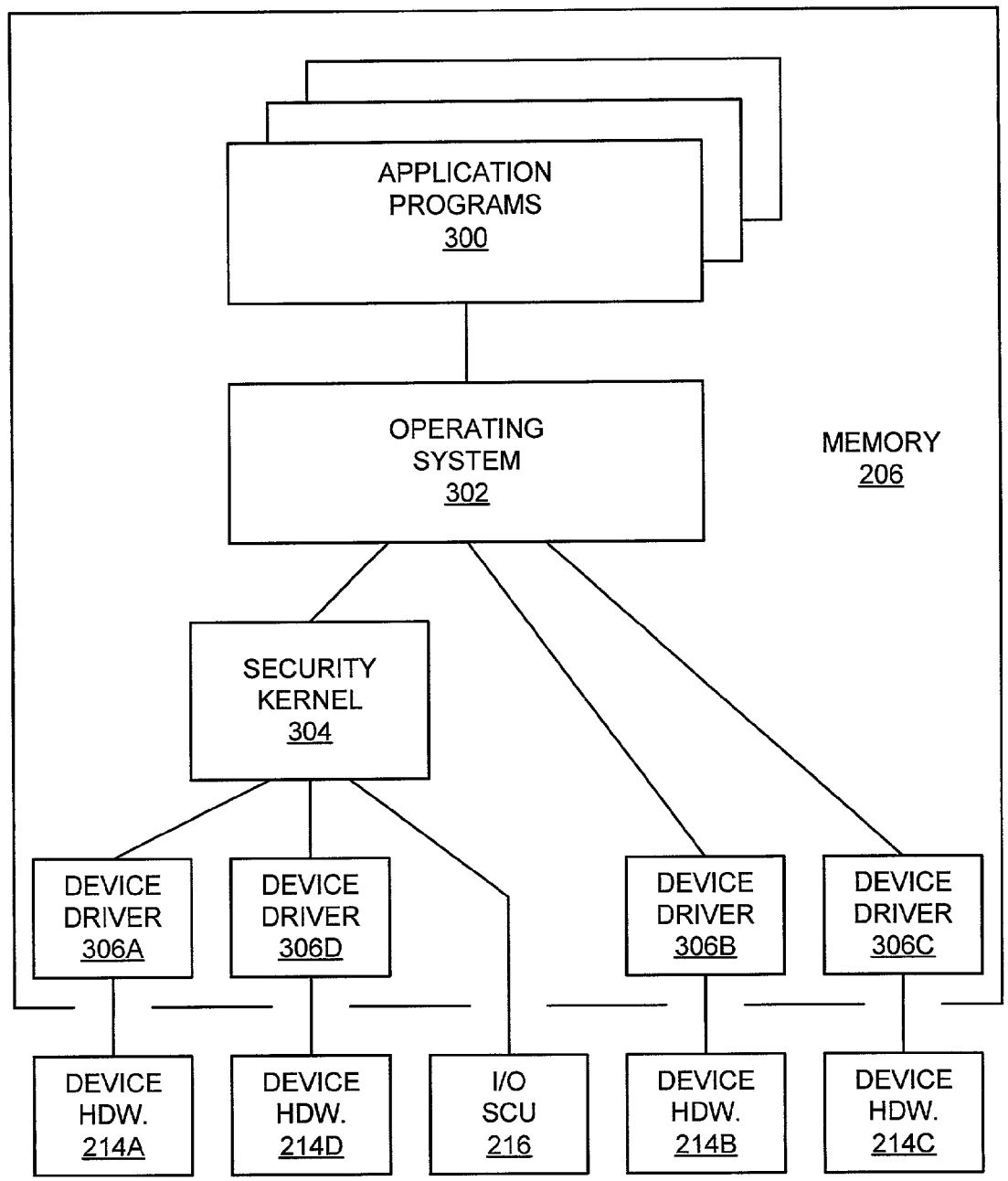
FIG. 3 is a diagram illustrating relationships between various hardware and software components of the computer system of FIG. 2.

FIG. 3 is a diagram illustrating relationships between various hardware and software components of the computer system 200 of FIG. 2. In the embodiment of FIG. 3, multiple application programs 300, an operating system 302, a security kernel 304, and device drivers 306A-306D are stored in the memory 206. The application programs 300, the operating system 302, the security kernel 304, and the device drivers 306A-306D include instructions executed by the CPU 202. The operating system 302 provides a user interface and software "platform" on top of which the application programs 300 run. The operating system 302 may also provide, for example, basic support functions, including file system management, process management, and input/output (I/O) control.

The operating system 302 may also provide basic security functions. For example, the CPU 202 (FIG. 2) may be an x86 processor that executes instructions of the x86 instruction set. In this situation, the CPU 202 may include specialized hardware elements to provide both virtual memory and physical memory protection features in the protected mode as described above. The operating system 302 may be, for example, one of the Windows® family of operating systems (Microsoft Corp., Redmond, Wash.) that operates the CPU 202 in the protected mode, and uses the specialized hardware elements of the CPU 202 to provide both virtual memory and memory protection in the protected mode.

As will be described in more detail below, the security kernel 304 provides additional security functions beyond the security functions provided by the operating system 302 to protect data stored in the memory 206 from unauthorized access. As indicated in FIG. 3, the security kernel 304 is coupled to the I/O SCU 216. As will be described in detail below, the I/O SCU 216 monitors all software-initiated accesses to the I/O ports in the I/O address space, and allows only authorized accesses to the I/O ports.

In the embodiment of FIG. 3, the device drivers 306A-306D are operationally associated with, and coupled to, the respective corresponding device hardware units 214A-214D. The device hardware units 214A and 214D may be, for example, "secure" devices, and the corresponding device drivers 306A and 306D may be "secure" device drivers. The security kernel 304 is coupled between the operating system 302 and the secure device drivers 306A and 306D, and may monitor all accesses by the application programs 300 and the operating system 302 to secure the device drivers 306A and 306D and the corresponding secure devices 214A and 214D. The security kernel 304 may prevent unauthorized accesses to the secure device drivers 306A and 306D and the corresponding secure devices 214A and 214D by the application programs 300 and the operating system 302. The device drivers 306B and 306C, on the other hand, may be "non-secure" device drivers, and the corresponding device hardware units 214B and 214C may be "non-secure" device hardware units. The device drivers 306B and 306C and the corresponding device hardware units 214B and 214C may be, for example, "legacy" device drivers and device hardware units.

It is noted that in other embodiments, the security kernel 304 may be part of the operating system 302. In yet other embodiments, the security kernel 304, the device drivers 306A and 306D, and/or the device drivers 306B and 306C may be part of the operating system 302.

Figure 4:
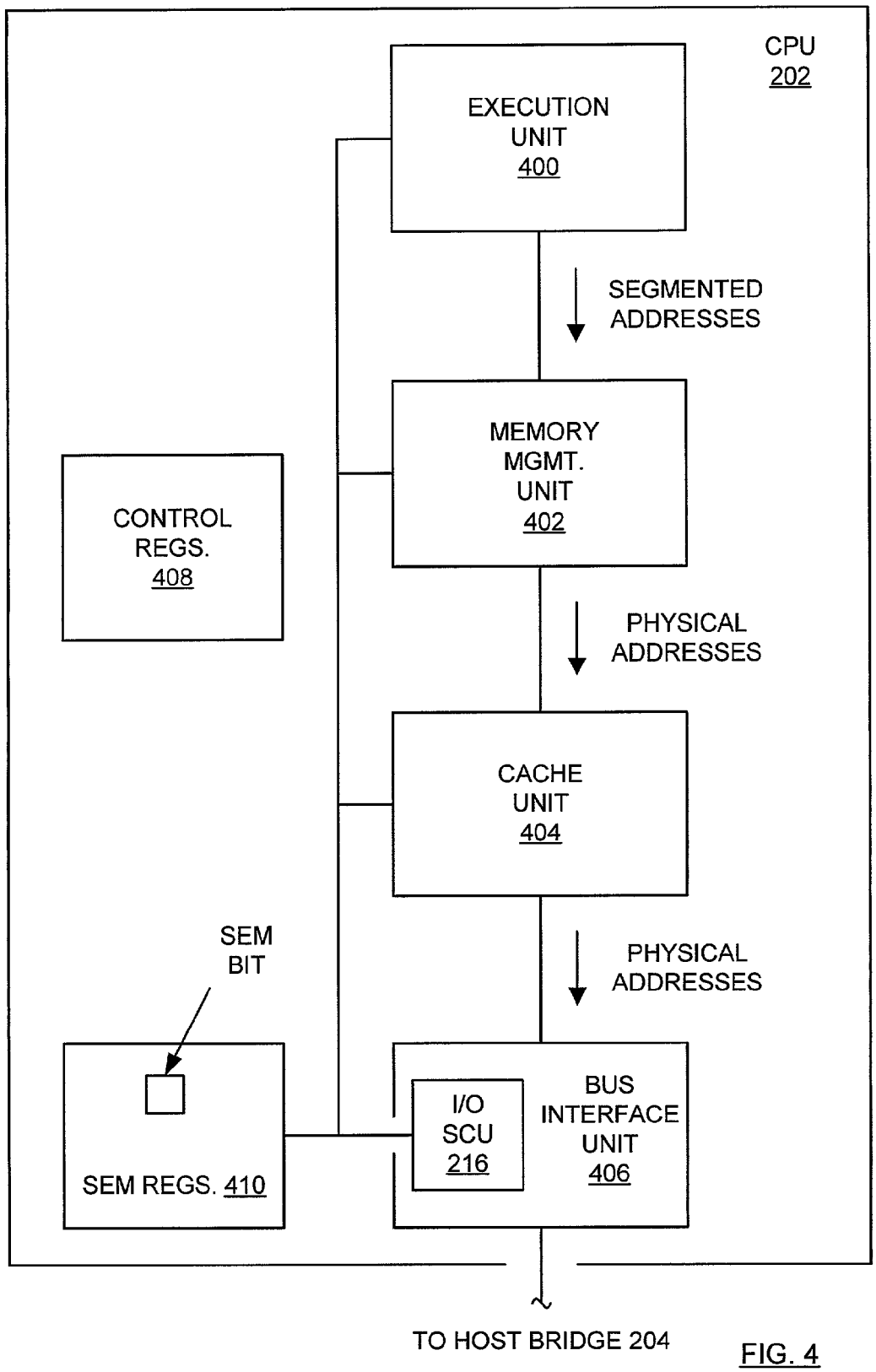
FIG. 4 is a diagram of one embodiment of the CPU of the computer system 200 of FIG. 2, wherein the CPU includes an execution unit, a memory management unit (MMU), and a bus interface unit (BIU) coupled to the execution unit and the MMU, and wherein the BIU includes the I/O SCU.

FIG. 4 is a diagram of one embodiment of the CPU 202 of the computer system 200 of FIG. 2. In the embodiment of FIG. 4, the CPU 202 includes an execution unit 400, a memory management unit (MMU) 402, a cache unit 404, a bus interface unit (BIU) 406, a set of control registers 408, and a set of secure execution mode (SEM) registers 410. The BIU 406 is coupled the to the host bridge 204 (FIG. 2), and forms an interface between the CPU 202 and the host bridge 204. The BIU 406 is also coupled to the memory 206 (FIG. 2) via the host bridge 204, and forms an interface between the CPU 202 and the memory 206. In the embodiment of FIG. 4, the I/O SCU 216 is located within the BIU 406.

As will be described in detail below, the set of SEM registers 410 are used to implement a secure execution mode (SEM) within the computer system 200 of FIG. 2, and the operation of the I/O SCU 216 is governed by the contents of the set of SEM registers 410. The SEM registers 410 are accessed (i.e., written to and/or read from) by the security kernel 304 (FIG. 3).

In the embodiment of FIG. 4, the set of SEM registers 410 includes a secure execution mode (SEM) bit. The computer system 200 of FIG. 2 may, for example, operate in the secure execution mode (SEM) when: (i) the CPU 202 is an x86 processor operating in the x86 protected mode, (ii) memory paging is enabled, and (iii) the SEM bit is set to '1.'

In general, the contents of the set of control registers 408 govern operation of the CPU 202. Accordingly, the contents of the set of control registers 408 govern operation of the execution unit 400, the MMU 402, the cache unit 404, and/or the BIU 406. The set of control registers 408 may include, for example, the multiple control registers of the x86 processor architecture.

The execution unit 400 of the CPU 202 fetches instructions (e.g., x86 instructions) and data, executes the fetched instructions, and generates signals (e.g., address, data, and control signals) during instruction execution. The execution unit 400 is coupled to the cache unit 404, and may receive instructions from the memory 206 (FIG. 2) via the cache unit 404 and the BIU 406.

The memory 206 (FIG. 2) of the computer system 200 includes multiple memory locations, each having a unique physical address. When operating in protected mode with paging enabled, an address space of the CPU 202 is divided into multiple blocks called page frames or "pages." Only data corresponding to a portion of the pages is stored within the memory 206 at any given time. In the embodiment of FIG. 4, address signals generated by the execution unit 400 during instruction execution represent segmented (i.e., "logical") addresses. The MMU 402 translates the segmented addresses generated by the execution unit 400 to corresponding physical addresses of the memory 206. The MMU 402 provides the physical addresses to the cache unit 404. The cache unit 404 is a relatively small storage unit used to store instructions and data recently fetched by the execution unit 400.

The BIU 406 is coupled between the cache unit 404 and the host bridge 204. The BIU 406 is used to fetch instructions and data not present in the cache unit 404 from the memory 206 via the host bridge 204. The BIU 406 also includes the I/O SCU 216. The I/O SCU 216 is coupled to the SEM registers 410, the execution unit 400, and the MMU 402. As described above, the I/O SCU 216 monitors all software-initiated accesses to the I/O ports in the I/O address space, and allows only authorized accesses to the I/O ports.

Figure 5:
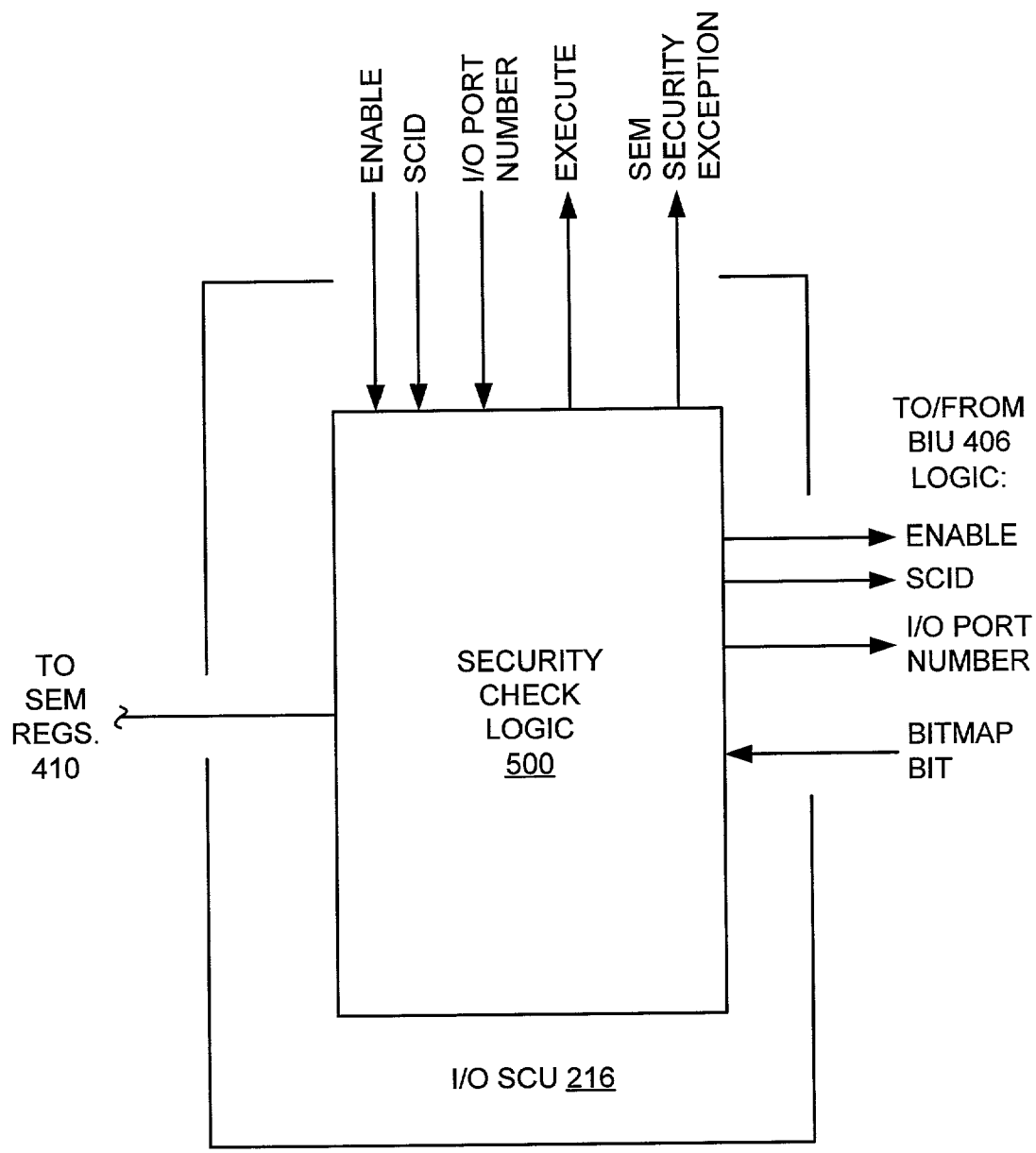
FIG. 5 is a diagram illustrating one embodiment of the I/O SCU of FIG. 4.

FIG. 5 is a diagram illustrating one embodiment of the I/O SCU 216 of FIG. 4. In the embodiment of FIG. 5, the I/O SCU 216 includes security check logic 500. The security check logic 500 receives an "ENABLE" signal and an I/O port number from the execution unit 400, and a security context identification (SCID) value from the MMU 402. The execution unit 400 may assert the ENABLE signal prior to executing an I/O instruction that accesses a "target" I/O port in the I/O address space. The I/O port number is the number of the target I/O port. The SCID value indicates a security context level of the memory page including the I/O instruction.

When the computer system 200 of FIG. 2 operates in the secure execution mode (SEM), the security kernel 304 (FIG. 3) generates and maintains one or more security attribute data structures (e.g., tables) in the memory 206 (FIG. 2). Each memory page has a corresponding security context identification (SCID) value, and the corresponding security context identification (SCID) value may be stored within the security attribute data structures. The MMU 402 uses an address generated during instruction execution (e.g., a physical address) to access the one or more security attribute data structures to obtain the security context identifications (SCIDs) of corresponding memory pages. In general, the computer system 200 has n different security context identification (SCID) values, where n is an integer and n≧1.

When the computer system 200 of FIG. 2 operates in the secure execution mode (SEM), the security kernel 304 (FIG. 3) also generates and maintains a secure execution mode (SEM) I/O permission bitmap in the memory 206 (FIG. 2). When the execution unit 400 (FIG. 4) executes an I/O instruction of a task, logic within the CPU 202 may first compare a current privilege level (CPL) of the task to an I/O privilege level (IOPL). If the current privilege level (CPL) of the task is at least as privileged as (i.e., is numerically less than or equal to) the I/O privilege level (IOPL), the logic within the CPU 202 may check the secure execution mode (SEM) I/O permission bitmap. If, on the other hand, the current privilege level (CPL) of the task is not as privileged as (i.e., is numerically greater than) the I/O privilege level (IOPL), then the execution unit 400 will not execute the I/O instruction. In one embodiment, a general protection fault will occur.

When the execution unit 400 (FIG. 4) asserts the ENABLE signal, the security check logic 500 provides the ENABLE signal, the received security context identification (SCID) value, and the received I/O port number to logic within the BIU 406. The logic within the BIU 406 uses the security context identification (SCID) value and the received I/O port number to access the secure execution mode (SEM) I/O permission bitmap, and provides the corresponding bit from the secure execution mode (SEM) I/O permission bitmap to the security check logic 500. If the corresponding bit from the secure execution mode (SEM) I/O permission bitmap is cleared to '0', the security check logic 500 may assert an output "EXECUTE" signal provided to the execution unit 400. In response to the asserted EXECUTE signals, the execution unit 400 may execute the I/O instruction. If, on the other hand, the corresponding bit is set to '1,' the security check logic 500 may assert an output "SEM SECURITY EXCEPTION" signal provided to the execution unit 400. In response to the asserted SEM SECURITY EXCEPTION signal, the execution unit 400 may not execute the I/O instruction, and may instead execute a secure execution mode (SEM) exception handler.

When the I/O instruction attempts to access a 16-bit word I/O port, or 32-bit double word I/O port, the execution unit 400 may provide the multiple byte I/O port numbers to the security check logic 500 in succession. If the security check logic 500 asserts the EXECUTE signal for each of the byte I/O port numbers, the execution unit 400 may execute the I/O instruction. If, on the other hand, the security check logic 500 asserts the SEM SECURITY EXCEPTION for one or more of the byte I/O port numbers, the execution unit 400 may not execute the I/O instruction, and may instead execute the secure execution mode (SEM) exception handler.

Figure 6:
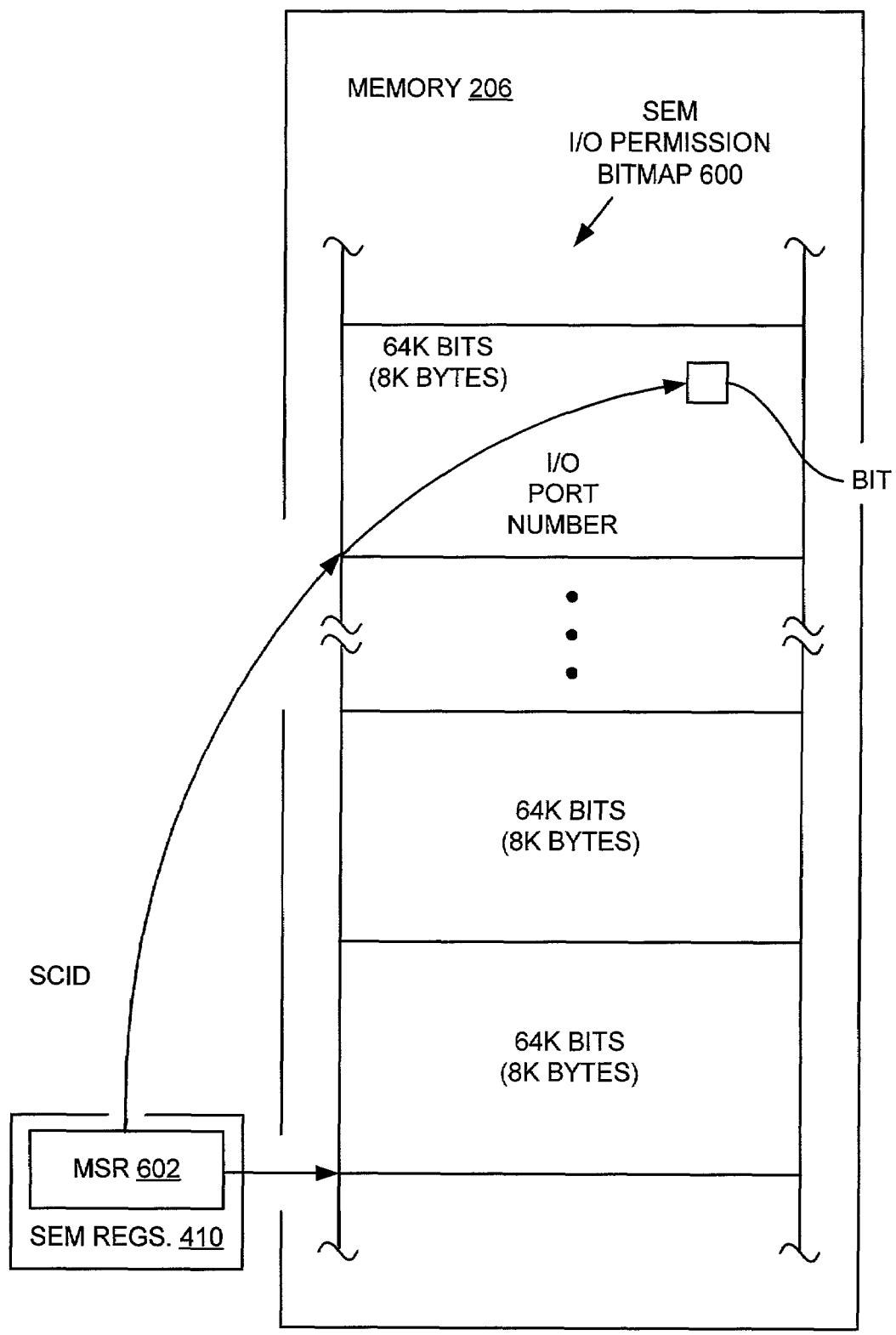
FIG. 6 is a diagram illustrating one embodiment of a secure execution mode (SEM) I/O permission bitmap stored within the memory of FIG. 2, and one embodiment of a mechanism for accessing the SEM I/O permission bitmap.

FIG. 6 is a diagram illustrating one embodiment of the secure execution mode (SEM) I/O permission bitmap, labeled 600 in FIG. 6, and one embodiment of a mechanism for accessing the secure execution mode (SEM) I/O permission bitmap 600. The mechanism of FIG. 6 may be embodied within the logic within the BIU 406 (FIG. 4), and may apply when the computer system 200 is operating in the secure execution mode (SEM). In FIG. 6, the set of secure execution mode (SEM) registers 410 includes a model specific register (MSR) 602. The model specific register (MSR) 602 is used to store a beginning (i.e., base) address of the secure execution mode (SEM) I/O permission bitmap 600. As described above, the computer system 200 has n different security context identification (SCID) values, where n is an integer and n≧1. The secure execution mode (SEM) I/O permission bitmap 600 includes a different I/O permission bitmap for each of the n different security context identification (SCID) values. Each of the separate I/O permission bitmaps include 64 k bits, or 8 k bytes.

In the embodiment of FIG. 6, the security context identification (SCID) value of the memory page including the I/O instruction that accesses the I/O port is used as a offset from the contents of the model specific register 602 (i.e., the base address of the secure execution mode I/O permission bitmap 600) into the one or more 64 k-bit (8 k-byte) I/O permission bitmaps making up the secure execution mode (SEM) I/O permission bitmap 600. As a result, the I/O permission bitmap corresponding to the security context identification (SCID) value is accessed. The I/O port number is then used as a bit offset into the I/O permission bitmap corresponding to the security context identification (SCID) value. The bit accessed in this manner is the bit corresponding to the I/O port defined by the I/O port number.

Figure 7:
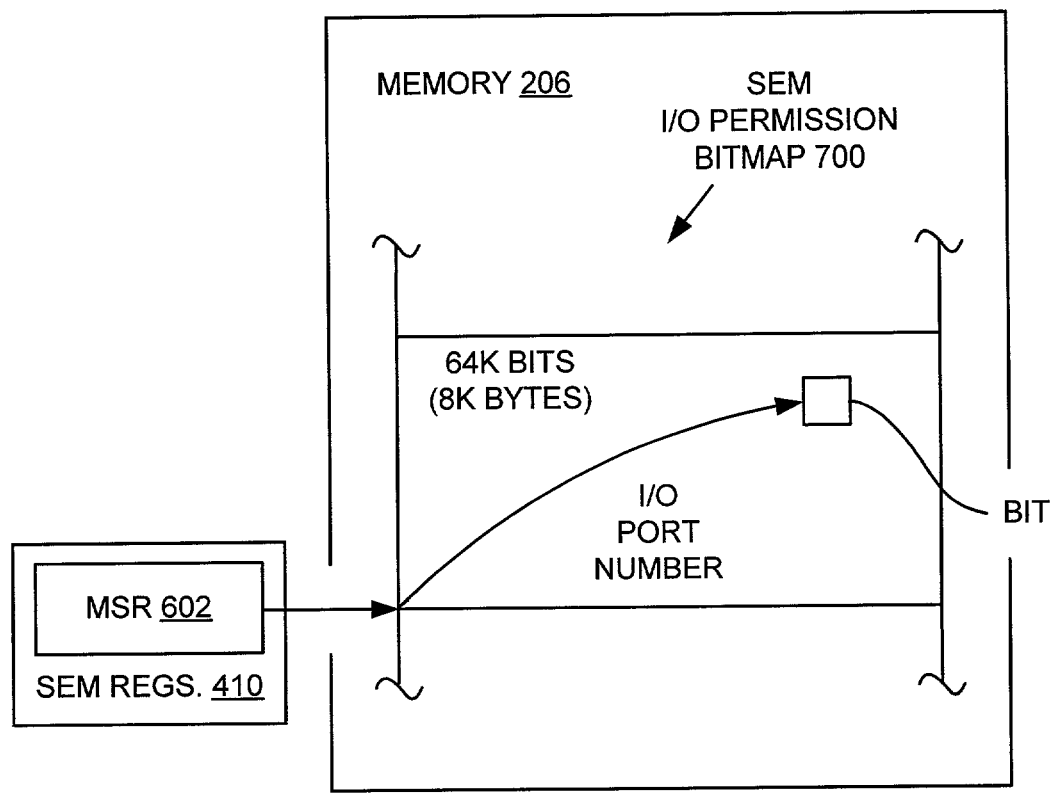
FIG. 7 is a diagram illustrating another embodiment of the SEM I/O permission bitmap of FIG. 6, and another embodiment of the mechanism for accessing the SEM I/O permission bitmap.

FIG. 7 is a diagram illustrating another embodiment of the secure execution mode (SEM) I/O permission bitmap, labeled 700 in FIG. 7, and another embodiment of the mechanism for accessing the secure execution mode (SEM) I/O permission bitmap. The mechanism of FIG. 7 may be embodied within the logic within the BIU 406 (FIG. 4). In the embodiment of FIG. 7, the secure execution mode (SEM) I/O permission bitmap 700 includes a single 64 k-bit (8 k-byte) I/O permission bitmap. The I/O port number is used as a bit offset from the contents of the model specific register 602 (i.e., the base address of the secure execution mode I/O permission bitmap 600) into the I/O permission bitmap. The bit accessed in this manner is the bit corresponding to the I/O port defined by the I/O port number.

Figure 8:
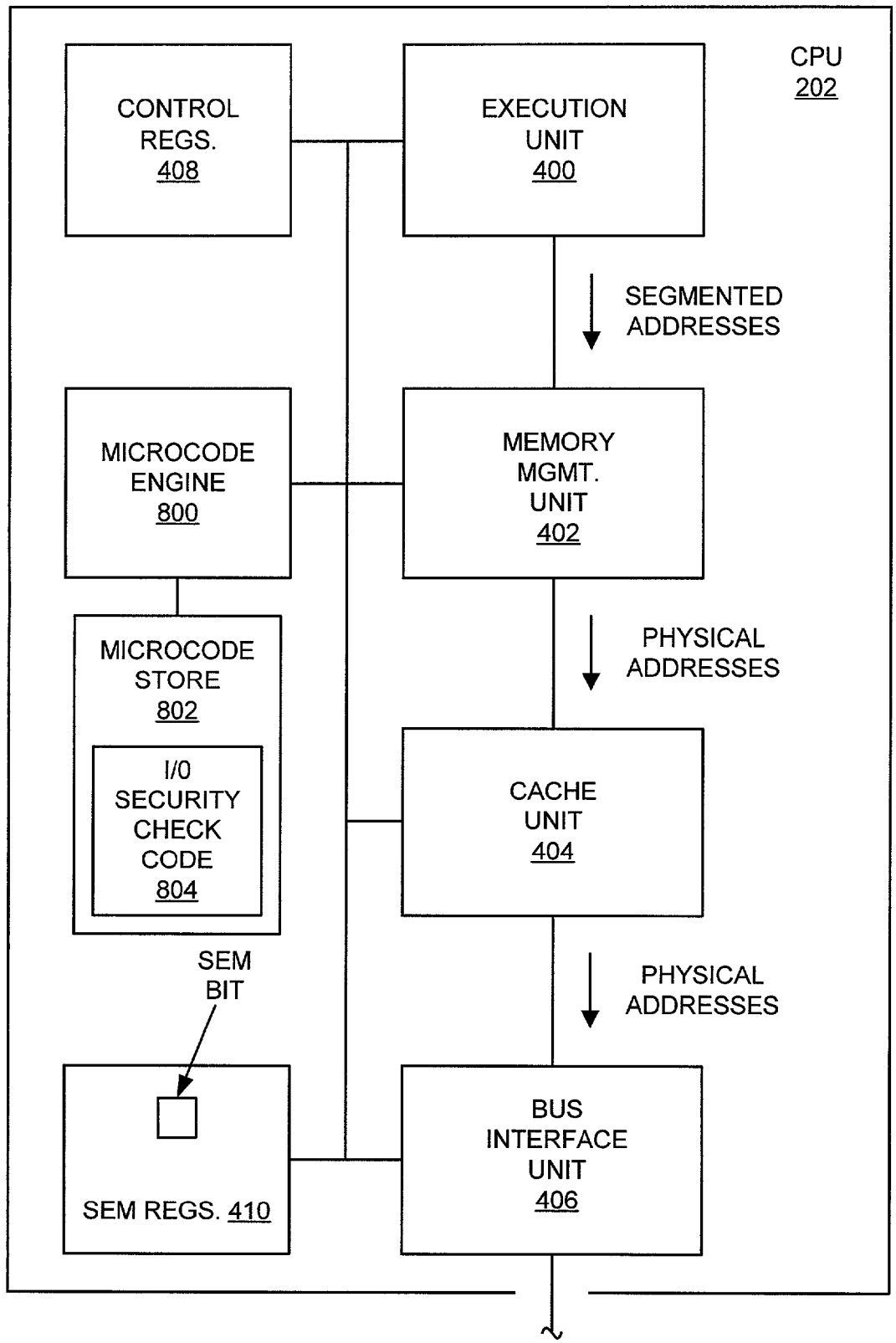
FIG. 8 is a diagram of an alternate embodiment of the CPU of the computer system of FIG. 2, wherein the CPU includes an execution unit, an MMU, a bus interface unit (BIU) coupled to the execution unit and the MMU, and a microcode engine coupled to the execution unit, the MMU, and the BIU, and wherein the microcode engine executes microcode instructions stored in a microcode store, and produces signals which control the operations of the execution unit, the MMU, and the BIU dependent upon the microcode instructions.

FIG. 8 is a diagram of an alternate embodiment of the CPU 202 of the computer system 200 of FIG. 2. In the embodiment of FIG. 8, the CPU 202 includes the execution unit 400, the memory management unit (MMU) 402, the cache unit 404, the bus interface unit (BIU) 406, the set of control registers 408, and the set of secure execution mode (SEM) registers 410 described above. In addition, the CPU 202 includes a microcode engine 800 and a microcode store 802. The microcode engine 800 is coupled to the execution unit 400, the MMU 402, the cache unit 404, the BIU 406, the set of control registers 408, and the set of secure execution mode (SEM) registers 410. The microcode engine 800 executes microcode instructions stored in the microcode store 802, and produces signals which control the operations of the execution unit 400, the MMU 402, the cache unit 404, and the BIU 406, dependent upon the microcode instructions and the contents of the set of control registers 408 and the set of secure execution mode (SEM) registers 410. The microcode engine 800 may also assist the execution unit 400 in executing more complex instructions of the x86 instruction set.

In the embodiment of FIG. 8, a portion of the microcode instructions stored in the microcode store 802 form I/O security check code 804. The I/O security check code 804 is executed when the computer system 200 of FIG. 2 is operating in the secure execution mode (SEM), and an I/O instruction is forwarded to the execution unit 400 for execution. In essence, the microcode instructions of the I/O security check code 804 cause the microcode engine 800 and the BIU 406 to perform the functions of the I/O SCU 216 (FIGS. 2-4) described above.

For example, when an I/O instruction is forwarded to the execution unit 400 for execution, the execution 400 may signal the presence of the I/O instruction to the microcode engine 800. The microcode engine may assert signals to the MMU 402 and the BIU 406. In response to a signal from the microcode engine 800, the MMU 402 may provide the security context identification (SCID) value of the memory page including the I/O instruction to the BIU 406. The execution unit 400 may provide the I/O port number accessed by the I/O instruction to the BIU 406.

In response to a signal from the microcode engine 800, the BIU 406 may use the security context identification (SCID) value and the received I/O port number to access the secure execution mode (SEM) I/O permission bitmap as described above, and may provide the corresponding bit from the secure execution mode (SEM) I/O permission bitmap to the microcode engine 800. If the corresponding bit from the secure execution mode (SEM) I/O permission bitmap is cleared to '0', the microcode engine 800 may continue to assist the execution unit 400 in completing the execution of the I/O instruction. If, on the other hand, the corresponding bit is set to '1', the microcode engine may signal the execution unit 400 to stop executing the I/O instruction and to start executing instruction of the secure execution mode (SEM) exception handler.

Figure 9:
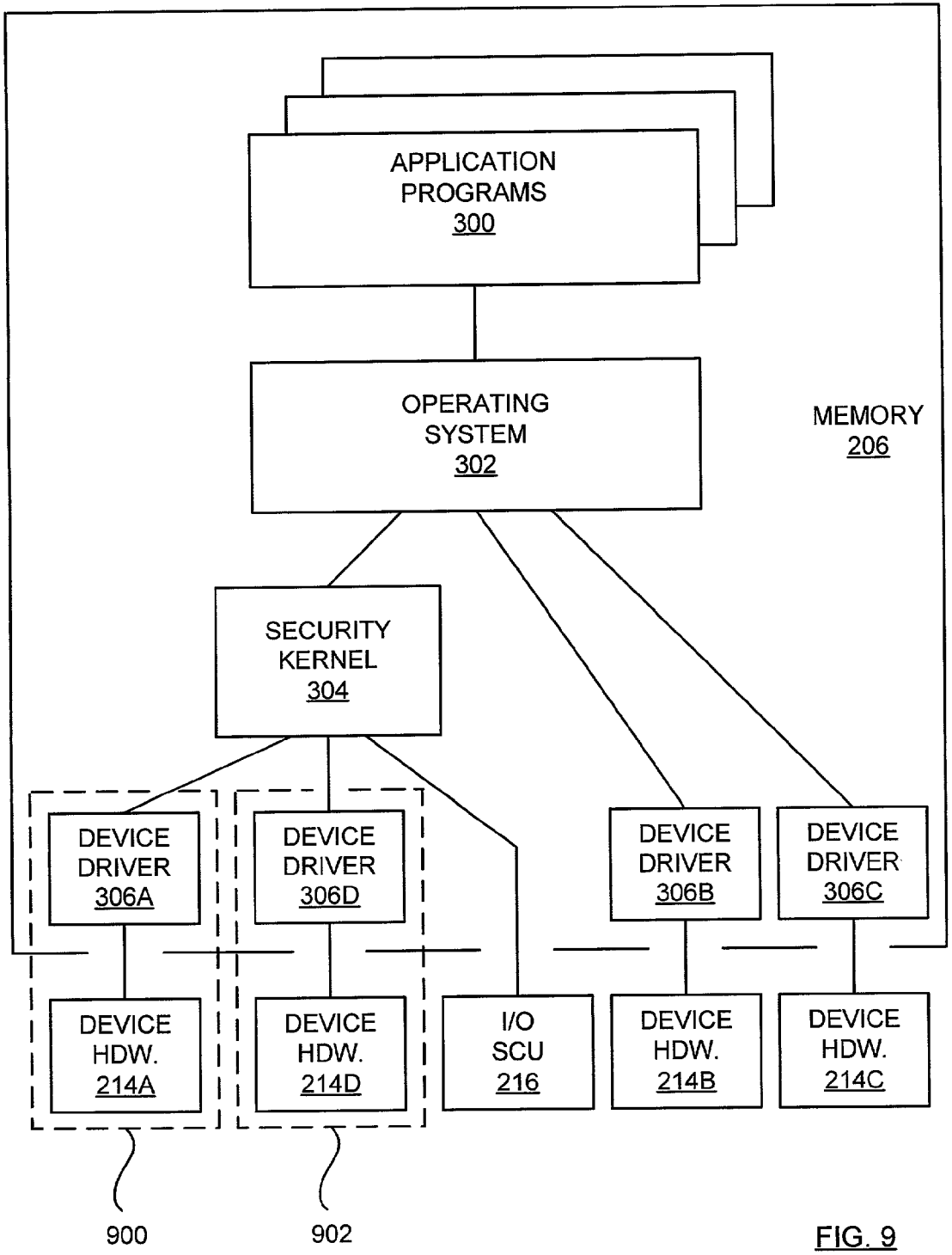
FIG. 9 is a diagram illustrating relationships between the various hardware and software components of the computer system of FIG. 2, wherein a first device driver and a corresponding first device hardware unit reside in a first security "compartment," and a second device driver and a corresponding second device hardware unit reside in a second security compartment separate, and operationally isolated from, the first security compartment.

FIG. 9 will now be used to describe how the assignment of security context identification (SCID) values, and the creations of corresponding secure execution mode (SEM) I/O permission bitmaps, serves to "compartmentalize" device drivers and associated device hardware units within the computer system 200 of FIG. 2 for security purposes. FIG. 9 is a diagram illustrating relationships between various hardware and software components of the computer system 200 of FIG. 2, wherein the device driver 306A and the corresponding device hardware unit 214A reside in a first security "compartment" 900, and the device driver 306D and the corresponding device hardware unit 214D reside in a second security compartment 902. The security compartments 900 and 902 are separate from, and operationally isolated from, each other. Only the device driver 306A is allowed to access the device hardware unit 214A, and only the device driver 306D is allowed to access the device hardware unit 214D. This "compartmentalization" of device drivers and associated device hardware units helps prevent malicious or errant code from negatively affecting the state of the device hardware units, or interfering with proper operation of the computer system 200 of FIG. 2.

For example, in the embodiment of FIG. 9, the memory pages including instructions of the device drivers 306A and 306D may be assigned different security context identification (SCID) values. A first secure execution mode (SEM) I/O permission bitmap created for the SCID value of the device driver 306A may allow the device driver 306A to access to a first portion of an I/O address space of the computer system 200 assigned to the device hardware unit 214A, and may not allow the device driver 306A to access to a second portion of the I/O address space assigned to the device hardware unit 214D. Similarly, a second secure execution mode (SEM) I/O permission bitmap created for the SCID value of the device driver 306D may allow the device driver 306D to access to the second portion of the I/O address space assigned to the device hardware unit 214D, and may not allow the device driver 306A to access to the first portion of the I/O address space assigned to the device hardware unit 214A. As a result, only the device driver 306A is allowed to access the device hardware unit 214A, and only the device driver 306D is allowed to access the device hardware unit 214D.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A processor adapted for coupling to a memory, the processor being capable of operating at one of a plurality of input/output (I/O) privilege levels, the processor comprising:
   an execution unit configured to execute I/O instructions;
   a memory management unit (MMU) configured to store data in the memory; and
   a bus interface unit (BIU) coupled to receive an input/output (I/O) port number and a security context identification (SCID) value, wherein the I/O port number indicates a number of an input/output (I/O) port referenced by an I/O instruction, wherein the SCID value indicates a security context level of a memory location including the I/O instruction and one of a plurality of input/output (I/O) permission bitmaps stored within the memory, and wherein the SCID value is determined independently of the I/O instruction stored in the memory location, wherein the BIU is configured to use, in response to receiving an enable signal indicating that the I/O instruction is at least as privileged as an operative I/O privilege level being used by the processor, the SCID value and the I/O port number to access the input/output (I/O) permission bitmap indicated by the SCID value to obtain a permission bit corresponding to the I/O port, and to produce an output signal dependent upon a value of the permission bit; and
   wherein the execution unit is coupled to receive the output signal and configured to execute the I/O instruction dependent upon the output signal.

2. The processor of claim 1, wherein one or more of the I/O instructions are stored in the memory.

3. The processor of claim 1, wherein the MMU is configured to store the data in the memory such that the data are arranged within a plurality of memory pages.

4. The processor of claim 1, wherein the BIU is connected to the execution unit and the MMU.

5. The processor of claim 1, wherein the I/O port number is received from the execution unit.

6. The processor of claim 1, wherein the SCID value is received from the MMU.

7. The processor of claim 1, wherein the I/O port number and the SCID value are received during execution of the I/O instruction by the execution unit.

8. The processor of claim 1, wherein the I/O permission bitmap comprises a plurality of permission bits, and wherein each of the permission bits corresponds to a different one of a plurality of I/O ports, and wherein each of the permission bits has a value indicating whether access to the corresponding I/O port is allowed.

9. The processor of claim 1, further comprising:
   a model specific register (MSR) configured to store a base address of the I/O permission bitmap.

10. The processor of claim 9, wherein the BIU accesses the I/O permission bitmap to obtain the permission bit corresponding to the I/O port number by using the I/O port number as a bit offset from contents of the MSR and into the I/O permission bitmap.

11. The processor of claim 1, wherein the I/O permission bitmap is a primary I/O permission bitmap, and wherein the primary I/O permission bitmap includes a plurality of secondary I/O permission bitmaps, and wherein each of the secondary I/O permission bitmaps comprises a plurality of permission bits, and wherein each of the permission bits of a given one of the secondary I/O permission bitmaps corresponds to a different one of a plurality of I/O ports, and wherein each of the permission bits has a value indicating whether access to the corresponding I/O port is allowed.

12. The processor of claim 11, wherein each of the secondary I/O permission bitmaps corresponds to a different one of a plurality of SCID values.

13. The processor of claim 11, further comprising a model specific register (MSR) configured to store a base address of the primary I/O permission bitmap.

14. The processor of claim 13, wherein the BIU accesses the I/O permission bitmap to obtain the permission bit corresponding to the I/O port number by using the SCID value as an offset from contents of the MSR into the primary I/O permission bitmap to determine a base address of a corresponding one of the secondary I/O permission bitmaps, and using the I/O port number as a bit offset from the base address of the corresponding one of the secondary I/O permission bitmaps and into the corresponding one of the secondary I/O permission bitmaps.

15. A computer system, comprising:
   a memory for storing data, wherein the data includes I/O instructions;
   a processor coupled to the memory, the processor being capable of operating at one of a plurality of input/output (I/O) privilege levels, the processor comprising:
      an execution unit configured to execute the I/O instructions;
      a memory management unit (MMU) configured to store data in the memory; and
      a bus interface unit (BIU) coupled to receive an input/output (I/O) port number and a security context identification (SCID) value, wherein the I/O port number indicates a number of an input/output (I/O) port referenced by an I/O instruction, wherein the SCID value indicates a security context level of a memory location including the I/O instruction and one of a plurality of input/output (I/O) permission bitmaps stored within the memory, and wherein the SCID value is determined independently of the I/O instruction to be stored in the memory location, wherein the BIU is configured to use, in response to receiving an enable signal indicating that the I/O instruction is at least as privileged as an operative I/O privilege level being used by the processor, the SCID value and the I/O port number to access the input/output (I/O) permission bitmap indicated by the SCID value to obtain a permission bit corresponding to the I/O port, and to produce an output signal dependent upon a value of the permission bit; and
      wherein the execution unit is coupled to receive the output signal and configured to execute the I/O instruction dependent upon the output signal.

16. A processor adapted for coupling to a memory, the processor being capable of operating at one of a plurality of input/output (I/O) privilege levels, the processor comprising:
   an execution unit configured to execute I/O instructions;
   a memory management unit (MMU) configured to store data in the memory;
   a bus interface unit (BIU) operably coupled between the execution unit and the MMU and the memory to form an interface between the processor and the memory; and
   a microcode engine coupled to the execution unit, the MMU, and the BIU, and configured to execute microcode instructions stored in a microcode store, wherein the microcode engine produces controls signals during execution of at least one of the microcode instructions, wherein a portion of the microcode instructions cause the microcode engine to produce controls signals that cause the BIU to:

receive an input/output (I/O) port number, an enable signal indicating that the I/O instruction is at least as privileged as an operative I/O privilege level being used by the processor, and a security context identification (SCID) value, wherein the I/O port number indicates a number of an input/output (I/O) port referenced by an I/O instruction, wherein the SCID value indicates a security context level of a memory location including the I/O instruction and one of a plurality of input/output (I/O) permission bitmaps stored within the memory, and wherein the SCID value is determined independently of the I/O instruction to be stored in the memory location, and use, in response to receiving the enable signal, the SCID value and the I/O port number to access the input/output (I/O) permission bitmap indicated by the SCID value to obtain a permission bit corresponding to the I/O port, and to produce an output signal dependent upon a value of the permission bit; and wherein the execution unit is coupled to receive the output signal and configured to execute the I/O instruction dependent upon the output signal.

17. The processor of claim 16, wherein one or more of the I/O instructions are stored in the memory.

18. The processor of claim 16, wherein the MMU is configured to store the data in the memory such that the data are arranged within a plurality of memory pages.

19. The processor of claim 16, wherein the I/O port number is received from the execution unit.

20. The processor of claim 16, wherein the SCID value is received from the MMU.

21. The processor of claim 16, wherein the I/O port number and the SCID value are received during execution of the I/O instruction by the execution unit.

22. The processor of claim 16, wherein the I/O permission bitmap comprises a plurality of permission bits, and wherein each of the permission bits corresponds to a different one of a plurality of I/O ports, and wherein each of the permission bits has a value indicating whether access to the corresponding I/O port is allowed.

23. The processor of claim 16, further comprising:
a model specific register (MSR) configured to store a base address of the I/O permission bitmap.

24. The processor of claim 22, wherein the BIU accesses the I/O permission bitmap to obtain the permission bit corresponding to the I/O port number by using the I/O port number as a bit offset from contents of the MSR and into the I/O permission bitmap.

25. The processor of claim 16, wherein the I/O permission bitmap is a primary I/O permission bitmap, and wherein the primary I/O permission bitmap includes a plurality of secondary I/O permission bitmaps, and wherein each of the secondary I/O permission bitmaps comprises a plurality of permission bits, and wherein each of the permission bits of a given one of the secondary I/O permission bitmaps corresponds to a different one of a plurality of I/O ports, and wherein each of the permission bits has a value indicating whether access to the corresponding I/O port is allowed.

26. The processor of claim 25, wherein each of the secondary I/O permission bitmaps corresponds to a different one of a plurality of SCID values.

27. The processor of claim 25, further comprising a model specific register (MSR) configured to store a base address of the primary I/O permission bitmap.

28. The processor of claim 27, wherein the BIU accesses the I/O permission bitmap to obtain the permission bit corresponding to the I/O port number by using the SCID value as an offset from contents of the MSR into the primary I/O permission bitmap to determine a base address of a corresponding one of the secondary I/O permission bitmaps, and using the I/O port number as a bit offset from the base address of the corresponding one of the secondary I/O permission bitmaps and into the corresponding one of the secondary I/O permission bitmaps.

29. The processor of claim 16, wherein the control signals control the operations of the execution unit, the MMU, and the BIU.

30. A computer system, comprising:
a memory for storing data, wherein the data includes input/output (I/O) instructions; and
a processor capable of operating at one of a plurality of input/output (I/O) privilege levels, comprising:
an execution unit configured to execute I/O instructions;
a memory management unit (MMU) configured to store data in the memory;
a bus interface unit (BIU) operably coupled between the execution unit and the memory, and the MMU and the memory, to form an interface between the processor and the memory; and
a microcode engine coupled to the execution unit, the MMU, and the BIU, and configured to execute microcode instructions stored in a microcode store, wherein the microcode engine produces controls signals during execution of at least one of the microcode instructions, wherein a portion of the microcode instructions cause the microcode engine to produce controls signals that cause the BIU to:
receive an enable signal indicating that the I/O instruction is at least as privileged as an operative I/O privilege level being used by the processor, an I/O port number and a security context identification (SCID) value, wherein the I/O port number indicates a number of an I/O port referenced by an I/O instruction, wherein the SCID value indicates a security context level of a memory location including the I/O instruction and one of a plurality of input/output (I/O) permission bitmaps stored within the memory, and wherein the SCID value is determined independently of the I/O instruction to be stored in the memory location, and
use, in response to receiving the enable signal, the SCID value and the I/O port number to access the input/output (I/O) permission bitmap indicated by the SCID value to obtain a permission bit corresponding to the I/O port, and to produce an output signal dependent upon a value of the permission bit; and
wherein the execution unit is coupled to receive the output signal and configured to execute the I/O instruction dependent upon the output signal.

31. A method for selectively executing an input/output (I/O) instruction, the method comprising:
creating a plurality of input/output (I/O) permission bitmaps in a memory, wherein each I/O permission bitmap comprises a plurality of permission bits, and wherein each of the permission bits corresponds to a different one of a plurality of I/O ports, and wherein each of the permission bits has a value indicating whether access to the corresponding I/O port is allowed;
receiving an enable signal indicating that the I/O instruction is at least as privileged as one of a plurality of input/output (I/O) privilege levels being used by the processor, an I/O port number and a security context identification (SCID) value, wherein the I/O port number indicates the I/O port referenced by the I/O instruction, and wherein the SCID value indicates a security context level of a memory location including the I/O instruction and one of the plurality of input/output (I/O) permission bitmaps stored within the memory, and wherein the SCID value is determined independently of the I/O instruction to be stored in the memory location;

using, in response to receiving the enable signal, the SCID value and the I/O port number to access the I/O permission bitmap indicated by the SCID value to obtain a permission bit corresponding to the I/O port; and executing the I/O instruction dependent upon a value of the permission bit corresponding to the I/O port.

32. The method of claim 31, further comprising:

storing data including the I/O instruction.

33. The method of claim 32, wherein storing the data including the I/O instruction further comprises storing the data including the I/O instruction in the memory.

34. The method of claim 33, wherein storing the data including the I/O instruction in the memory further comprises storing the data including the I/O instruction in the memory such that the data are arranged within a plurality of memory pages.

35. The method of claim 31, wherein receiving the I/O port number and the SCID value further comprises receiving the I/O port number and the SCID value during execution of the I/O instruction.

36. The method of claim 31, wherein executing the I/O instruction dependent upon the value of the permission bit corresponding to the I/O port further comprises executing the I/O instruction if the value of the permission bit corresponding to the I/O port indicates access to the I/O port is allowed.

* * * * *